(12) United States Patent
Meijer et al.

(10) Patent No.: US 8,108,848 B2
(45) Date of Patent: Jan. 31, 2012

(54) AUTOMATIC AND TRANSPARENT MEMOIZATION

(75) Inventors: Henricus Johannes Maria Meijer, Mercer Island, WA (US); Jeffrey van Gogh, Redmond, WA (US); Brian C. Beckman, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 1056 days.

(21) Appl. No.: 11/839,046

(22) Filed: Aug. 15, 2007

(65) Prior Publication Data

US 2009/0049421 A1      Feb. 19, 2009

(51) Int. Cl.
 G06F 9/45    (2006.01)
 G06F 7/00    (2006.01)
 G06F 17/30   (2006.01)
 G06F 13/00   (2006.01)

(52) U.S. Cl. ........ 717/151; 717/141; 717/153; 717/158; 707/713; 707/715; 707/718; 707/775; 708/200; 711/118; 711/202

(58) Field of Classification Search ........................ None
 See application file for complete search history.

(56) References Cited

U.S. PATENT DOCUMENTS

| | | | |
|---|---|---|---|
| 5,748,961 A | 5/1998 | Hanna | |
| 5,987,254 A | 11/1999 | Subrahmanyam | |
| 6,341,281 B1 | 1/2002 | MacNicol et al. | |
| 6,553,394 B1* | 4/2003 | Perry et al. | 708/200 |
| 6,850,925 B2 | 2/2005 | Chaudhuri | |
| 6,912,700 B1* | 6/2005 | Franco et al. | 716/103 |
| 7,089,174 B2 | 8/2006 | Ishtiaq | |
| 7,363,289 B2* | 4/2008 | Chaudhuri et al. | 1/1 |
| 7,774,376 B1* | 8/2010 | Meijer et al. | 707/802 |
| 7,966,313 B2* | 6/2011 | Bruno et al. | 707/713 |
| 2002/0078431 A1* | 6/2002 | Reps | 717/100 |
| 2006/0090034 A1* | 4/2006 | Ishihara et al. | 711/118 |
| 2006/0155965 A1 | 7/2006 | Altman | |
| 2007/0006120 A1 | 1/2007 | Proebsting | |
| 2007/0033659 A1 | 2/2007 | Hoche | |
| 2010/0131556 A1* | 5/2010 | Meijer et al. | 707/771 |
| 2010/0205590 A1* | 8/2010 | Puchinger et al. | 717/153 |

OTHER PUBLICATIONS

Boyer at al., "Function Memoization and Unique Object Representation for ACL2 Functions", ACL2 Workshop 2006 Seattle, Washington USA, ACM, pp. 1-8.*
wordiQ, "Definition of Memoization", Oct. 24, 2004, 1 page.*
Peter Norving, "Techniques for Automatic Memoization with Applications to Context-Free Parsing", 2003, University of California, pp. 91-98.*
Acar et al., "Selective Memoization", 2003, ACM, pp. 1-12.*
Guo et al., "Using Automatic Persistent Memoization to Facilitate Data Analysis Scripting", Jul. 17, 2011, ACM, pp. 1-11.*
Scott Draves. Automatic Program Specialization for Interactive Media. Jul. 22, 1997. http://reports-archive.adm.cs.cmu.edu/anon/anon/usr0/ftp/home/ftp/1997/CMU-CS-97-159.pdf. Last accessed May 14, 2007.

(Continued)

*Primary Examiner* — Thuy Dao
*Assistant Examiner* — Ben Wang

(57) ABSTRACT

Functions are memoized automatically and transparently. Memoized code can be injected automatically within a program to facilitate efficient and/or expeditious execution thereof, among other things. The memoized code can intercept calls to an original function and return values in accordance with the code. Accordingly, callers of the function need not do anything special and can invoke the function without knowledge of it being memoized.

18 Claims, 15 Drawing Sheets

OTHER PUBLICATIONS

Koenraad De Smedt. Object-oriented and frame-based programming in CommonORBIT. http://ling.uib.no/~desmedt/papers/corbit.pdf. Last accessed May 14, 2007.

Marty Hall, et al. Improving Software Performance with Automatic Memoization. John Hopkins APL Technical Digest, vol. 15, No. 2 (1997). http://techdigest.jhuapl.edu/td1802/hall.pdf. Last accessed May 14, 2007.

Umut A. Acar, et al. Self-Adjusting Programming. http://www.cs.cmu.edu/~rwh/papers/sap/mlw05.pdf. Last accessed May 14, 2007.

* cited by examiner

AUTOMATIC AND TRANSPARENT MEMOIZATION

BACKGROUND

Computer programs are groups of instructions that describe actions to be performed by a computer or other processor-based device. When a computer program is loaded and executed on computer hardware, the computer will behave in a predetermined manner by following the instructions of the computer program. Accordingly, the computer becomes a specialized machine that performs the tasks prescribed by the instructions.

In the early years of computing, sets of instructions or programs were relatively small. Over time, programs continue to expand in both length and complexity. Even with processing power and other hardware capacity doubling every twelve months in accordance with Moore's Law, some programs are constrained or limited by their hardware counterparts. Moreover, problems can exist for execution of extensive programs on resource sensitive systems such as mobile devices (e.g., phones, palmtop computers, music players . . . ). Various technologies are consequently employed to facilitate program execution within a given environment.

Memoization is one conventionally employed optimization technique for expediting program execution. Upon initial function evaluation, results are stored or cached for subsequent use. The next time a function is called with the same parameters, a cached result can be immediately returned rather than re-computing the result anew. Many computations can be made significantly more efficient by remember results of previous computations. In effect, memoization involves a runtime trade-off of memory space for execution speed.

A typical example of memoization involves the Fibonacci function, which identifies a sequence of numbers whose values are the sum of the previous two values following two starting values. In particular, the function can be defined as follows:
Fib(1)=1
Fib(2)=1
Fib(n)=Fib(n−1)+Fib(n−2)
If the definition for Fib(n−1) in the last line is unfolded, the result is:

$$Fib(n) = Fib(n-1-1) + Fib(n-1-2) + Fib(n-2)$$
$$= Fib(n-2) + Fib(n-3) + Fib(n-2)$$

As shown, there are redundant computations, namely Fib(n−2). In fact, an exponential number of steps is required to compute the Fib(n) (viz. $O(c^n)$). By modifying the Fibonacci function to cache or memoize previous computations, the function can run in linear time (viz. O(n)).

Functions or procedures are conventionally memorized manually by programmers. An assessment is initially made regarding whether or not it would be beneficial to memoized a function. Subsequently, a function can be rewritten in memorized form where desired. Alternatively, a new memoized function can be generated and targeted by calls previously designating the original version.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the disclosed subject matter pertains to automatic and transparent memoization. Code can be injected statically and/or dynamically behind the scenes, that memoizes a program construct such as a function. The injected code can intercept calls to an original construct and process the construct in a memoized manner. Moreover, memoization can be invisible to users and the memoized function itself. Accordingly, nothing special needs to be done such as rewriting original calls to invoke a memoized version.

In accordance with an aspect of the disclosure, code can be analyzed and constructs memoized automatically and transparently as a function of the analysis. For example, a function can be memoized and/or un-memoized based on context. Further, values can be pre-fetched and loaded into a cache to facilitate execution of a memoized function. Additionally or alternatively, memoized values can be cleared to force re-computation, among other things.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods are provided related to automatic and transparent function memoization. A function can be defined normally and subsequently overridden by memorizing it. Memoized code can intercept calls to an original function and process calls as well as return results in a memoized manner. Among other things, memoization can be employed to optimize code execution and transform functions to idempotent functions. Furthermore, memoization can be added, removed, primed and/or reset automatically and dynamically as a function of context and/or policy, for instance. Still further yet, a memoized storage structure such as a table can be imported and/or exported such that state is portable.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
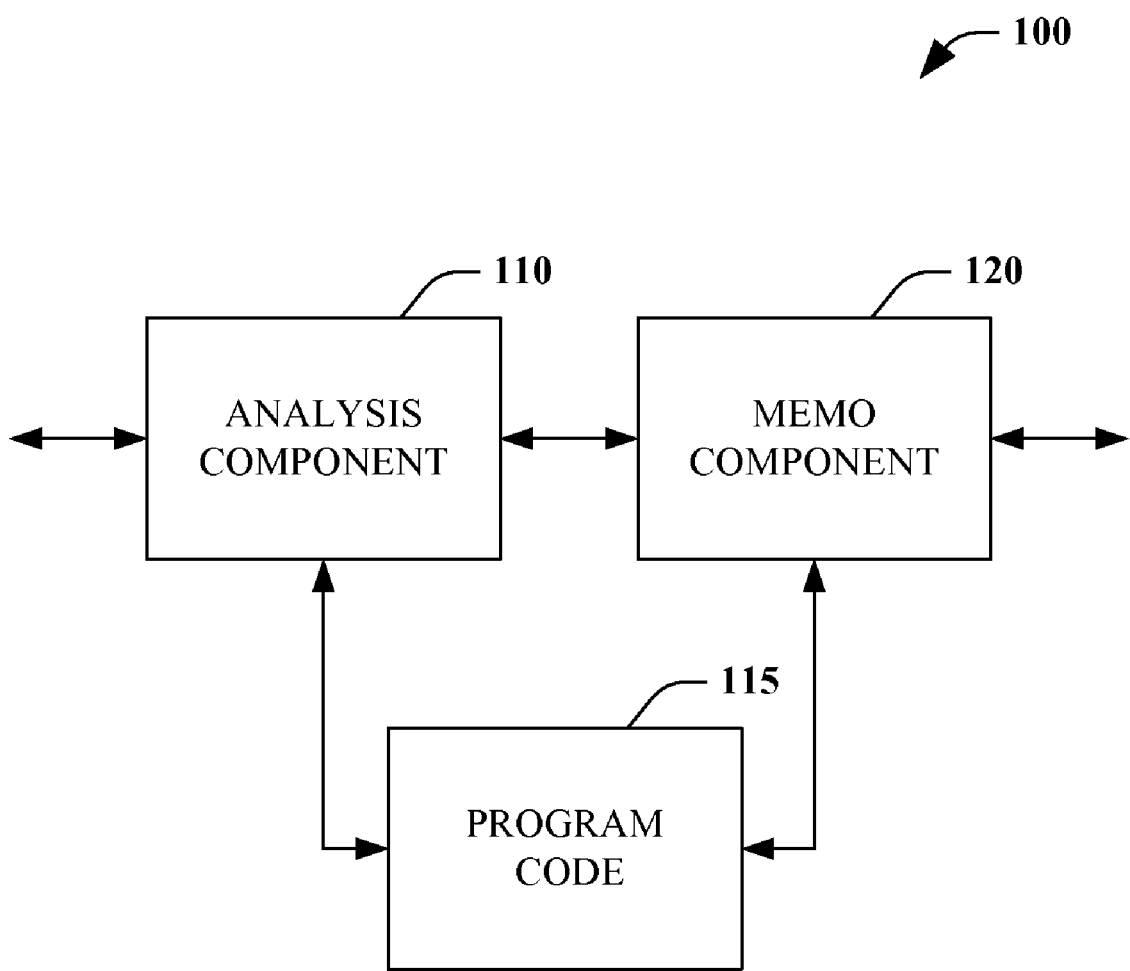
FIG. 1 is a block diagram of a memoizaiton system in accordance with an aspect of the disclosed subject matter.

Referring initially to FIG. 1, a memoization system 100 is illustrated in accordance with an aspect of the claimed subject matter. The system 100 facilitates automatic and transparent function memoization via analysis component 110 and memo component 120.

The analysis component 110 analyzes programmatic code among other things seeking to identify candidate functions for memoization. For example, the analysis component 110 can engage in control and/or data flow analysis to identify functions for memoization. Additionally or alternatively, the analysis component 110 can seek to match functions with function signatures or patterns know to benefit form memoization. By way of example, a factorial function can be identified by the analysis component 110. Further, analysis of programmatic context can be employed to identify constructs to be memoized. Still further yet, the analysis component 110 can detect explicit designation of a function for memoization.

The analysis component 110 is communicatively coupled to the memo component 120 and operable to transmit, identify or otherwise make available functions to be memoized. Subsequently or concurrently, the memo component 120 can memoized the function. While the memo component 120 can rewrite the function into a memoized version, it can also simply inject code that overrides the original memo function in accordance with an aspect of the claimed subject matter. Furthermore, such memoization can be performed transparently or invisibly such that memoization is unobservable by users and/or the memoized function itself. Accordingly, memoization can be both automatic and transparent.

As will be described further hereinafter, the memo component 120 can inject code that intercepts calls to an original function and returns a result in a memoized fashion. For example, where a function with one or more arguments has been previously computed and cached, the "remembered" value can be returned. Alternatively, the original code can be called to compute the value for caching and return. Further yet, memoization can be employed to transform functions to idempotent functions, among other things.

It is to be appreciated that the components 110 and 120 can be utilized in a variety of configurations and/or environments. In one embodiment, the components 110 and 120 can operate on the same piece of programmatic code 115. For example, code 115 can be dynamically modified at runtime to memoize one or more functions. Additionally or alternatively, and as described further below, the analysis component 110 and/or memo-component 120 can form part of a compiler that translates code from a first language to a second language. During translation or compilation of a static language program to a dynamic language program, for instance, memoization code can be injected automatically or in response to explicit specification in the first language.

Figure 2:
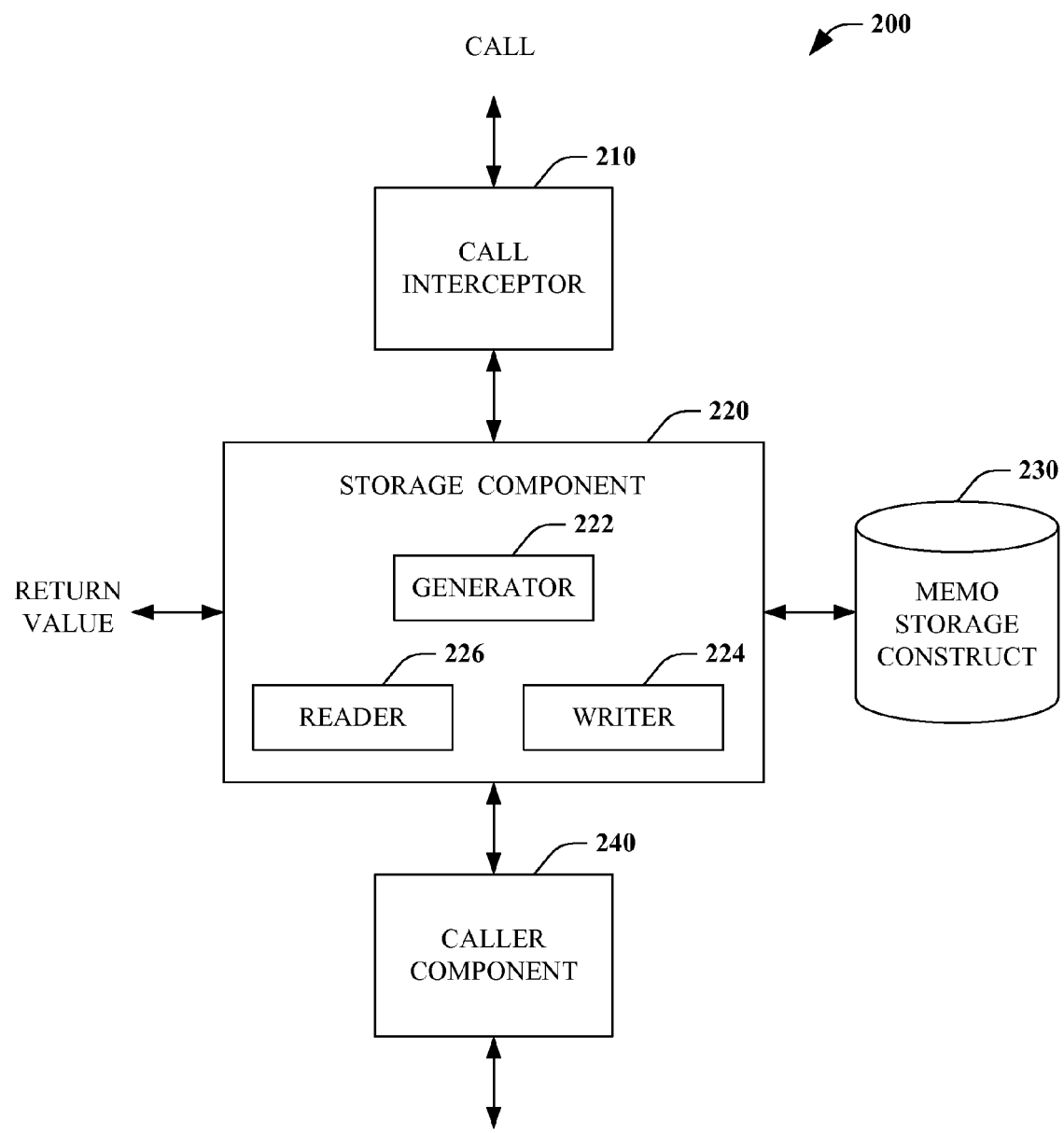
FIG. 2 is a block diagram of a system for function memoization in accordance with an aspect of the disclosed subject matter.

FIG. 2 depicts a system 200 for memoizing a function in accordance with an aspect of the claimed subject matter. Although not limited thereto, in one embodiment the system 200 can correspond to at least a portion of code injected into a program by the memo component 120 of FIG. 1. The system 200 includes a call interceptor component 210 that intercepts calls to a memoized construct such as a function or procedure. Rather than enabling calls to invoke the original or un-memoized construct, the interceptor component 210 captures the calls and redirects them to a memoized version. Here, the interceptor component 210 can pass a call and/or arguments associated therewith to the storage component 220.

The storage component 220 provides a plurality of functionality pertaining to storing and returning computed results. The storage component 220 includes three subcomponents to effect such functionality: generation component 222, writer component 224 and reader component 226. The generation component 222 is operable to generate or setup a memo storage construct 230. This is the construct that will be utilized to store or remember computed function results. The writer component 224 can write values to the storage construct 230, and reader component 226 can read values from the storage construct 230. In operation, the storage component 220, upon acquiring a call, can access the storage construct 230 to determine if results were previously cached. If so, the results can be immediately returned in one instance. Alternatively, the storage component 220 can utilize the caller component 230 to call the original function, procedure or the like, cache and return the results.

In one instance, the memo storage construct 230 can be a table such as a hash table. Accordingly, various functions can be utilized to identify keys, indices or storage locations within the table, for example based on memorized function arguments. These hash functions can be provided or otherwise identified in a number of manners. In one instance, a hash function or key selector can be explicitly specified in code. This provides programmers with control over the function and can also enable the function to be pluggable or provisioned from an external source such as a third party. Alternatively, a default function can be utilized for instance where no explicit function specification is provided. Additionally or alternatively, a function can be selected or inferred as a function of contextual information such as the nature of a memorized function or distribution thereof. Moreover, in one instance, the memo table or other memo storage construct 230 can be employed using method instance fields or variables rather than separate global program constructs.

To further understand the nature of a memoization function consider the following simplified exemplary code:

```
function Fib(n) {...};
Fib = memo(Fib, function(x){...});
```

Here, the Fibonacci function "Fib(n)" in the first line is overridden by the memoization of the later specified second line. As a result any calls to Fib will be captured by the second line of code, which calls memo on "Fib" accepting as arguments the original function call "Fib" and a function (e.g., anonymous) "function (x) { . . . }" for key selection.

A simplified memo function that can be inlined and/or provided via a library (e.g., dynamically linked library (dll)) is shown below as an example:

```
function memo(h, keyselector) {
    var memo = { };
    return function( ){
        var key = keyselector(arguments);
        var r = memo[key];
        if(!r) {
            memo[key] = h.apply(null, arguments);
        }
        return memo[key];
    }
}
```

The "memo" function takes another function "h" and a "keyselector" function. Called by the previous code "h" is "Fib" and "keyselector" is "function(x) { . . . }." Upon calling, the memo function first instantiates a memo construct ("memo= { }") in the first line. Subsequently, the "keyselector" function is executed on the arguments of "h" to return a key. This key is then used to access the memo table to locate a result of a prior computation. If a result exists, it can be returned immediately with "return memo[key]." Alternatively, the original un-memoized function is called ("h.apply"), the result cached ("memo[key]") and then returned ("return memo[key]").

Figure 3:
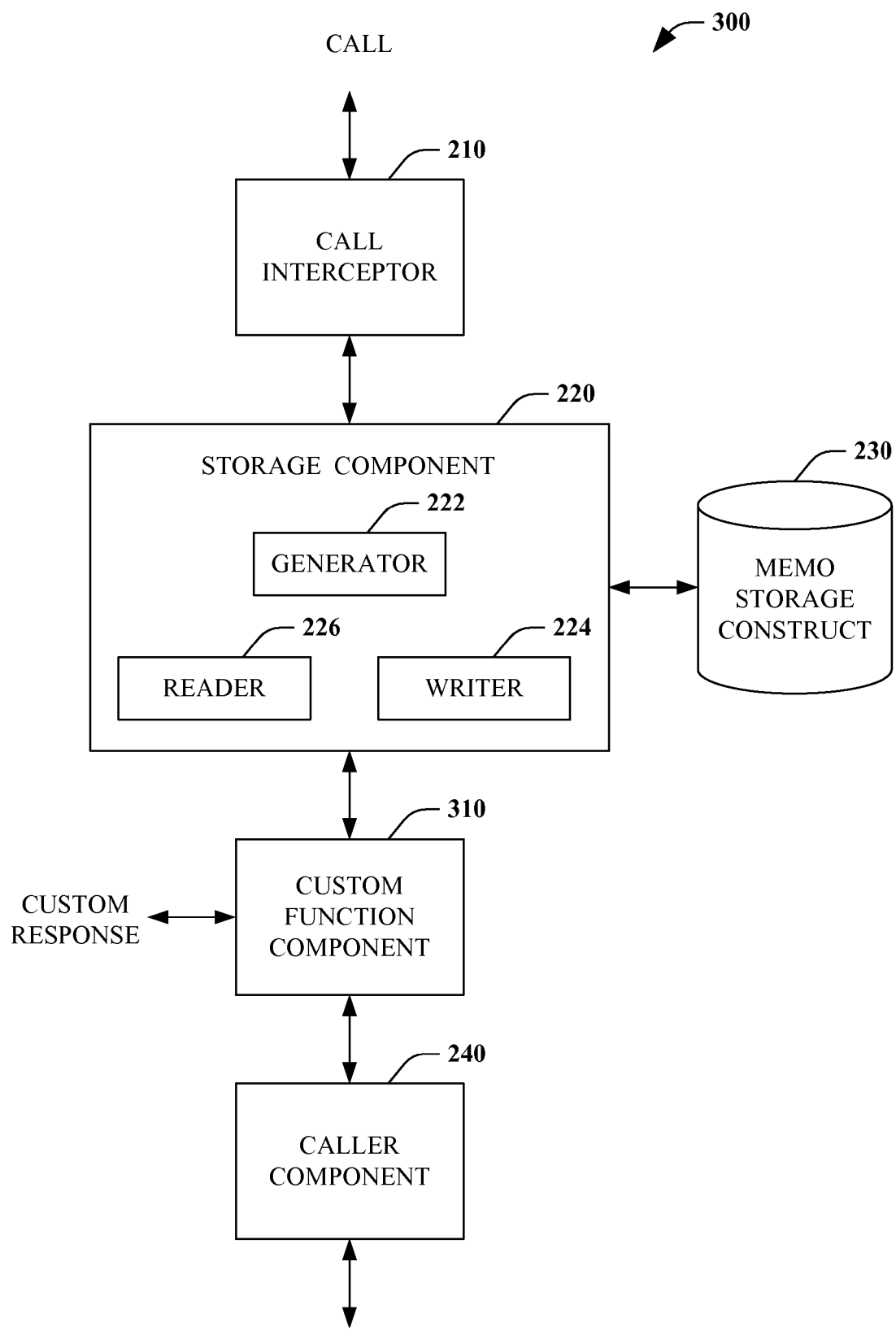
FIG. 3 is a block diagram of a system for customized function memoization in accordance with an aspect of the disclosed subject matter.

FIG. 3 illustrates a system 300 for custom function memoization in accordance with an aspect of the claimed subject matter. Similar to system 200 of FIG. 2, the system 300 includes the call interceptor component 210, storage component 220, memo storage construct 230 and caller component 240, as previously described. In brief, the call interceptor component 210 intercepts calls to a function or the like. The storage component 220 stores and returns values from the memo storage construct 230 and can also employ the caller component 240 to invoke the original function where values are not cached. This provides a means for optimizing function execution utilizing a cache or store of previously computed values. However, memoization can also be customized utilizing the customized function component 310 to provided differing functionality. The customized function component 310 can therefore provide a customized response.

In one instance, additional or alternate functionality can be injected by the custom function component 310 pertaining to optimization of creation or detection of cycles. Consider recursion (e.g., function Repeat (n) {return {head: n, tail: Repeat (n)}}) or mutual recursion, for example. In these cases, backpatching may be required to provide values to various recursive levels. Such patching can be injected in the previously provided memo function code snippet as follows:

```
function memo(h, keyselector) {
    var memo = { };
    return function( ){
        var key = keyselector(arguments);
        var r = memo[key];
        if(!r) {
            var z = new Error("blackhole");
            memo[key] = z;
            memo[key] = h.apply(null, arguments);
            patch(memo[key], z);
        }
        return memo[key];
    }
}
function patch(root, node) {
    function recurse(current){
        for(var n in current){
            var x = current[n];
            if(x === node) { current[n] = root; return; }
            recurse(x);
        }
    }
    recurse(root);
}
```

Here, if the function has not yet been called with a particular set of arguments, a dummy value can be inserted into the memo table and the original function called. Upon return, the memo table is updated with the computed value and the patch function executed. Optionally, before the memo table is updated, the result of the function call can be scanned for occurrences that are identical to the dummy value, which then are replaced by back links to the root of the computed value. (If the computed value includes sub-values that are identical to the dummy value, it means that the function was called recursively with exactly the same arguments, i.e. the function was used to create a recursive graph).

It is to be appreciated that there are several ways to optimize backpatching. By way example and not limitation, at the moment a dummy value is discovered in a recursive call, the call stack can be traversed and the dummy value replaced with a reference to the root. If the programming language supports by reference arguments, reference to a root can be passed by reference inside the dummy value and a cycle created right when the recursive call happens. It is also possible to pass a call back function in the dummy value to establish a communication channel between a call in which a cycle is detected and a call in which the root is established.

Yet another option is to represent cycles by returning the key itself as a value. When on subsequent calls a key is returned as the value of the lookup, a second lookup can be made to return the root of the graph. This effectively delays traversal of the graph until a cycle is actually traversed on demand.

The following provides exemplary mutually recursive code that employs the aforementioned memo function:

```
function Ping(n) {
    return { head: n, tail: Pong(n−1) };
}
Ping = memo(Ping, function(x){ return x[0]; });
function Pong(n) {
    return { head: n, tail: Ping(n+1) };
}
Pong = memo(Pong, function(x){ return x[0]; });
WScript.Echo(Ping(10).tail.tail.tail.tail.tail.tail.tail.head);
WScript.Echo(Pong(10).tail.tail.tail.head);
```

Here, the function "Ping" and "Pong" are defined normally and then overridden by the memoized version. In accordance with an aspect of the claimed subject matter, the nothing special had to be done with respect to the original functions "Ping" and "Pong" and the functions themselves are not aware that they are memoized.

In accordance with an aspect of the claimed subject matter, memoization can have additional uses beside execution optimization such as preserving code correctness. By way of example and not limitation, the customized function component 310 can include functionality for transforming any function into an idempotent function. In other words, execution of a function more than once does not introduce any undesired side effects.

As a particular example, consider the singleton pattern, which restricts instantiation of a class to a single object. In this case, the first instance of an object is created and it can be cached by storage component 222. The next time the function is called, it can simply return the same thing. Among other things, this can be utilized in type creation in which a function is called to create a new type. If one attempts to create another type, the previously created type is return. More concretely, consider a generic type list of "T" as a function that given a "T" will return a type that represents list of "T." If list of integer is called twice, it is often desired that the same type be returned otherwise the type system becomes messed up. Accordingly, memoization is not simply a matter of performance caching but rather a means to preserve the same object so the same identity is always returned.

Consider also the double click problem, where clicking on a webpage button more than once causes multiple submissions of orders, for example. Many times this problem is addressed by notifying a user to only click once, thus forcing a user to remember whether or not he/she already activated the button. Now, on-click button functionality can be memoized in a manner that shifts the onus to the program. In particular, the custom function component 310 can capture the first click and do nothing in response to subsequent clicks. The function can simply return without performing any action. Of course, it could also trigger a notification or message that an order or the like has already been submitted, among other things.

In another instance, the custom function component 310 could perform logging. Corporate and government regulations often require logging actions concerning data access. Memoization can inject such logging functionality among other things dynamically and transparently. In addition or as an alternative to looking up values in a memo table, information can be written to the memo table and/or a log file concerning function use including when the function was called, by whom, on what data, etc. In this case, memoization pertains to memorizing function usage.

Furthermore, custom function component 310 can aid program security. For example, arguments and/or return values can be encrypted or signed for non-repudiation and/or tamper proofing. Further, upon occurrence of one or more events or after a period of time, inter alia, a function can be made non-playable or playable. For instance, the number of times a function is played or executed can be memoized and utilized to allow or prevent execution. In essence, logical signatures of functions can look the same but extra security can be added in this manner.

Custom functionality can allow utilizing memoization for executing co-routines and/or continuations. For example, a function can have multiple return points. It is unknown where a function is going to return and it might have yields as well. Not only can it return from different places but it can also return continuations to different places in itself. These things can be memoized as well. In this case, continuations can be thought of as pictures or effigies of a stack, which can be memoized.

Figure 4:
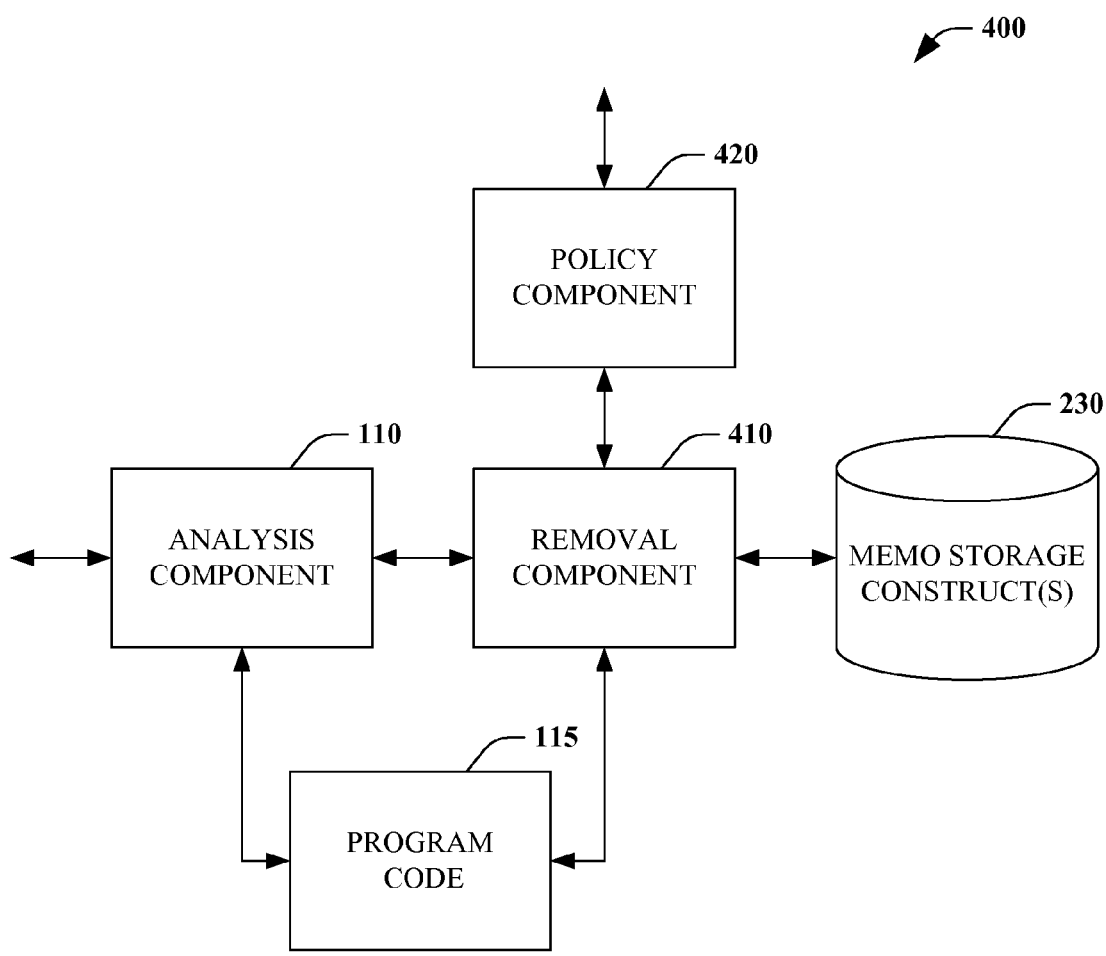
FIG. 4 is a block diagram of a memoized value removal system in accordance with an aspect of the disclosed subject matter.

Referring to FIG. 4 a memoization system 400 is illustrated in accordance with an aspect of the claimed subject matter. In some instances, it can be desirable to remove previously cached values. For example, updated values can be desired or storage space can become constrained. The system 400 provides a mechanism to remove previously cached or stored values effectively resetting memoization.

The system 400 includes an analysis component 410 that can analyze program code 115 dynamically at runtime, for example. Additionally, the analysis component 110 can provide external context information regarding program processing. Information gathered by the analysis component 110 can be gathered and provided to removal component 410. The removal component 410 can remove cached/stored values in memo storage construct 120. Based on data provided from the analysis component 110 and/or the program code 115, among other things, removal of values can be triggered. Alternatively, current values can be overwritten with other values such as a default.

The system 400 also includes a policy component 420 that provides policies or instructions regarding if, when, and/or which values should be removed. Policies can be specifically specified by programs or fall back to a default. The policy component 420 can thus act to control undo of caching. For example, the policy component 420 can cause the entire cache of in memo storage construct 230 to be cleared after a given time or upon occurrence of an event.

Figure 5:
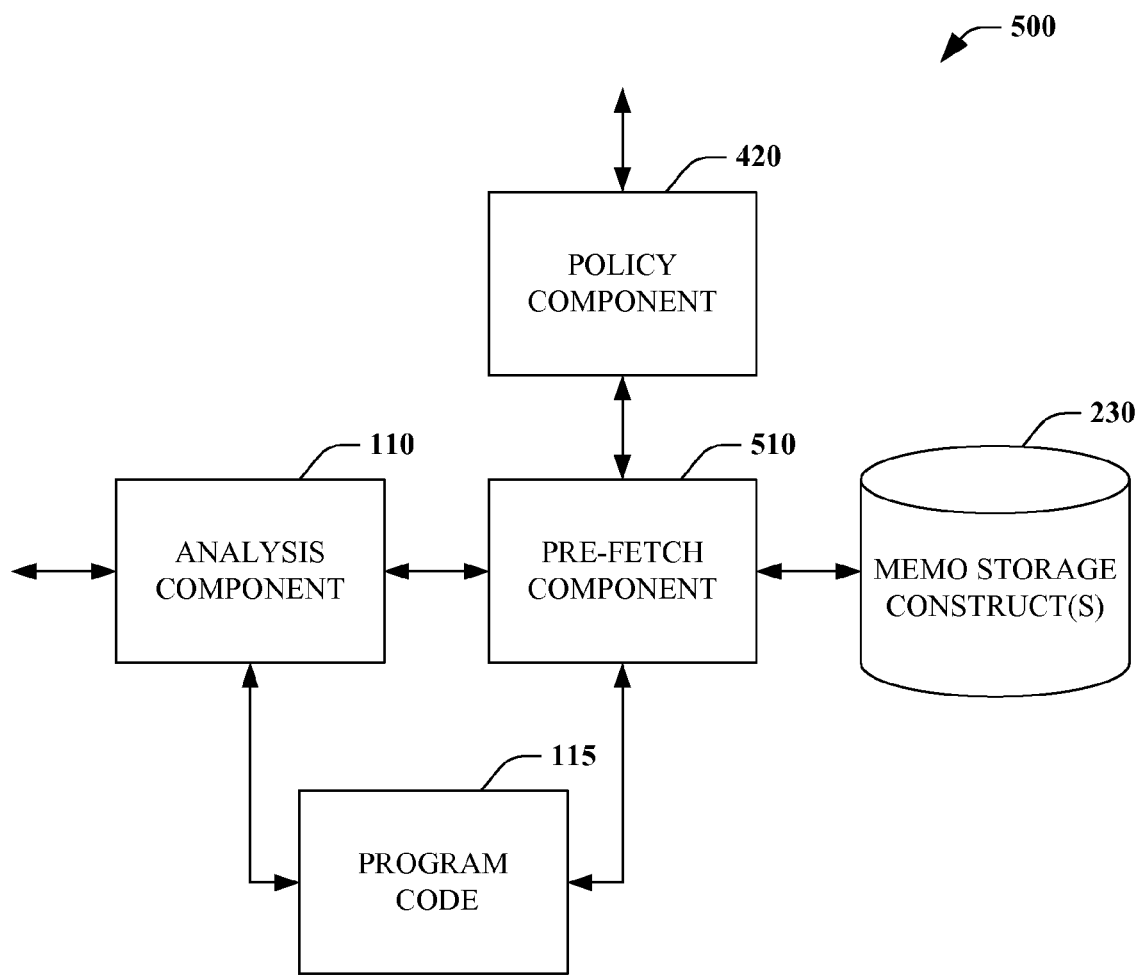
FIG. 5 is a block diagram of a pre-fetching system in accordance with an aspect of the disclosed subject matter.

Turing attention to FIG. 5, a pre-fetching system 500 is depicted in accordance with an aspect of the claimed subject matter. Similar to system 400 of FIG. 4, the system 500 includes analysis component 110, program code 115, memo storage construct 230 and policy component 420. Additionally, the system 400 includes a pre-fetch component 510. The pre-fetch component 510 pre-fetches values and caches or loads them in memo storage construct 320. This can be termed a form of clairvoyant caching where memoization is started for functions and/or values that are not currently being used but likely to be called in the future. Pre-fetch component 510 can be influenced or controlled by the analysis component 110, the program code 115 and/or the policy component 410. For example, code can be instrumented and analyzed by the analysis component to identify or infer scenarios provided by default or the policy component 410. In response, the pre-fetch component 510 can opportunistically fill a cache utilizing a background thread for instance.

By way of example, suppose it can be determined or inferred from program profile information that a Fibonacci (1-50) is going to be generated. Now in the background the pre-fetch component 510 can execute the function and load the memo storage construct with computed values. When the function is actually called the memoized version of the function can simply return the cached values. This can all be done asynchronously in the background in a transparent or invisible manner.

Figure 6:
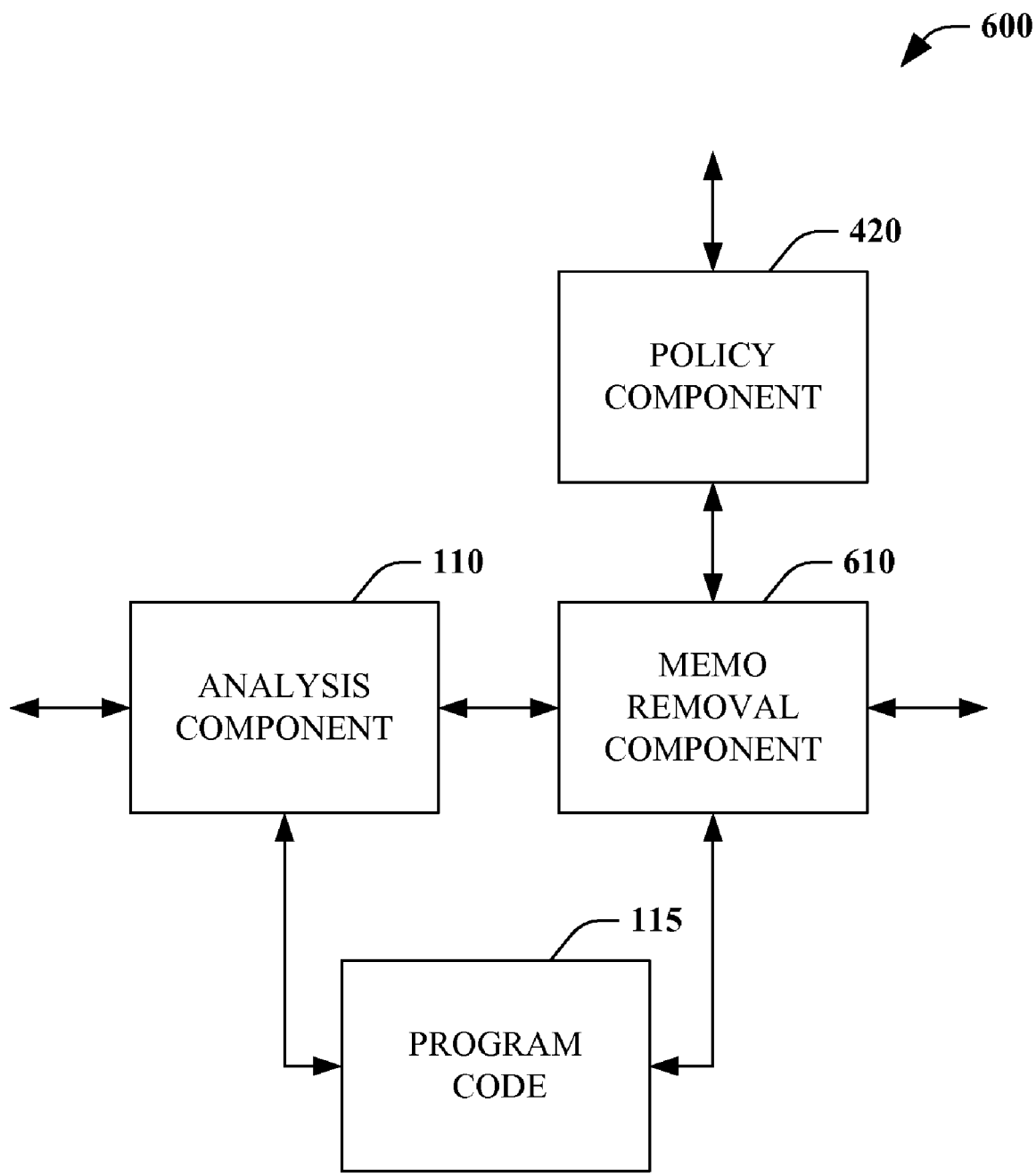
FIG. 6 is a block diagram of a memoization removal system in accordance with an aspect of the disclosed subject matter.

FIG. 6 illustrates a memoization removal system 600 in accordance with an aspect of the claimed subject matter. It can be useful to remove memoization in some cases such as in transparent, occasionally connected situations. For example, consider a function that represents a proxy for a web service. If online connectivity is enabled, it may be desirable not to cache and use cached values but rather connect to the live web service and return current results. System 600 enables this functionality.

In particular, the analysis component 110 can analyze code such as the program code 115 and/or external context such network connectivity, among other things. This information can be provided to the memo removal component 610. Based on this information and optionally a removal policy afforded by policy component 420, memoization can be removed. In one instance, previously injected memoization code can dynamically removed from the program code 115. Additionally or alternatively, code that removes memoization can be output for later use. Sometimes cached values can be used and other times new values can be re-computed.

Overall, there can be two memoization modes, namely cache on or cache off. This can be accomplished utilizing a combination of one or more components from FIGS. 1, 3, 4 and 5. Previously, once a function was memoized it always returned memoized values. Additionally or alternatively, a value can be computed, memoized and the computed value returned; the value can simply be computed and returned without memoization and/or a hybrid thereof. In one instance, a policy can specify when a cached value is returned, when the value is computed fresh and whether a cache is updated with the computed value. For example, consider a function that provides the latest stock price. If offline, a cached value can be returned. If online, the latest value can be retrieved, memoized and returned. Consider also a function that returns an exception. Based on a policy and/or context, explicit instruction or the like the exception can be memoized such that the exception is immediately returned upon a subsequent function call or un-memoized to enable the exception to be generated again.

Figure 7A:
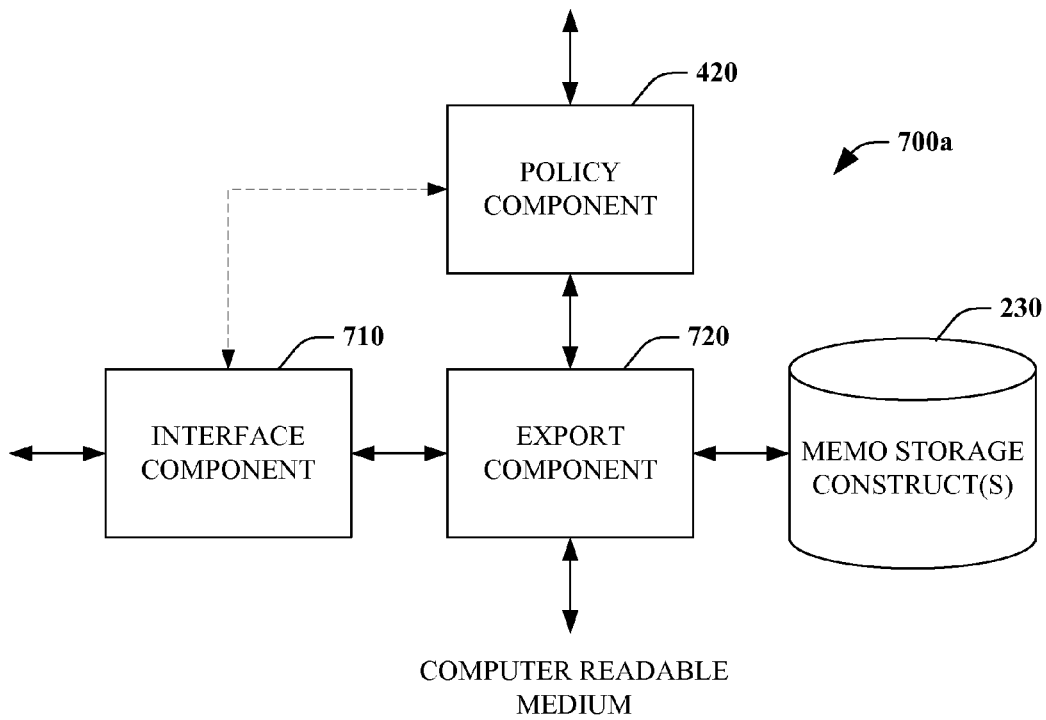
FIG. 7a is a block diagram of a memo export system in accordance with an aspect of the disclosed subject matter.

Referring to FIG. 7a a memo export system 700a is illustrated in accordance with an aspect of the claimed invention. Information captured by a memo construct such as a table or the like need not remain local. It can also be exported to a computer readable medium for saving and/or transportation via system 700a. More specifically, the system 700a can include an interface component 710 and export component 720 communicatively coupled to a one or more memo storage constructs 230. The interface component 710 allows users or other entities to interact with the export component 720. The export component 720 can acquire all or a portion of data from a memo construct 230 and export it to an external computer readable medium or other component in accordance with instructions provided via the interface component 710.

Additionally, the system 700a can include a policy component 420 that can facilitate provisioning of policies, rules or instructions that govern the actions of the export component 720. Furthermore, the interface component 710 can provide context information from a user or other source that can be utilized to trigger exportation in accordance with a policy. For example, a policy can state that a memo table should be exported to a computer readable medium at a certain time or upon occurrence of an event. Time or event occurrence information can be provided to the export component 720 and/or policy component 420 such that action can be initiated upon satisfaction of a policy or rule.

Figure 7B:
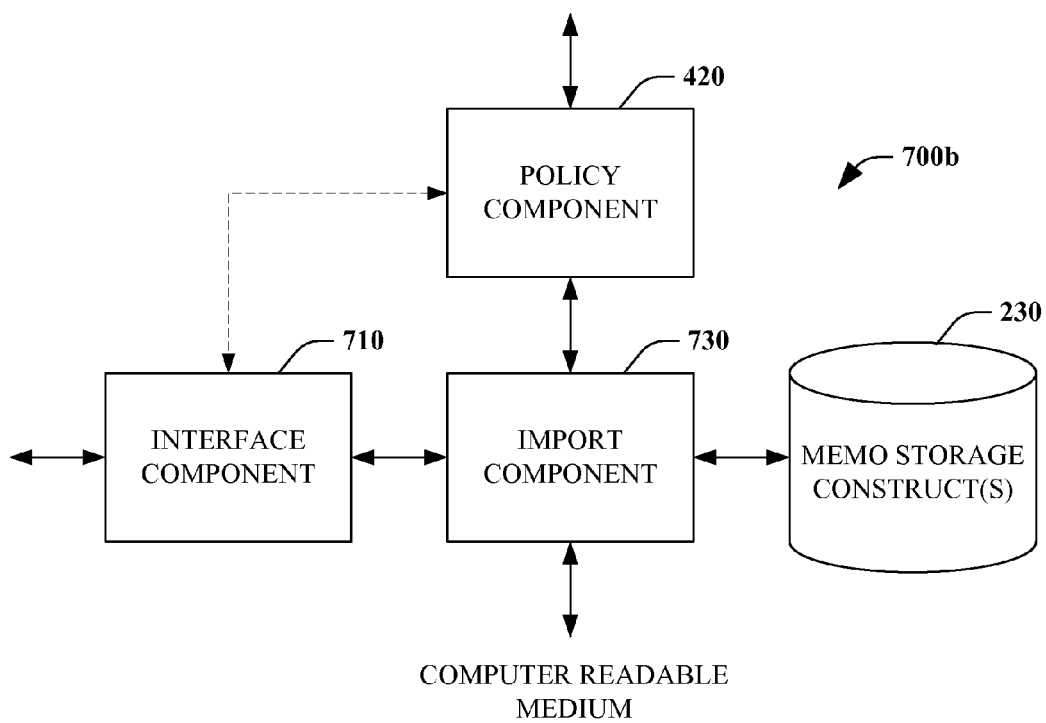
FIG. 7b is a block diagram of a memo import system in accordance with an aspect of the disclosed subject matter.

FIG. 7b is a diagram illustrating a memo import system 700b in accordance with an aspect of the claimed subject matter. Similar to system 700a of FIG. 7a, the system 700b includes the interface component 710, policy component 420 and one or more memo storage constructs 230. In addition, the system 700a includes an import component 730 as opposed to an export component 720. Accordingly, system 700b is the dual of system 700a.

The import component 730 can acquire data from a computer readable medium or other source and populate a memo storage construct 230 with such data. Applicability of the functionality provided by import component 730 can be governed or influenced by the interface component 710 and policy component 420 or information provided thereby. For example, the interface component 710 can receive an explicit instruction from a user or other entity to import memo data. Alternatively, the a policy component 420 can provide a default or explicitly specified policy identifying if, when and/or how data is memo data is imported as a function of context information provided via interface component 710 and/or a computer readable medium including the data.

Figure 8:
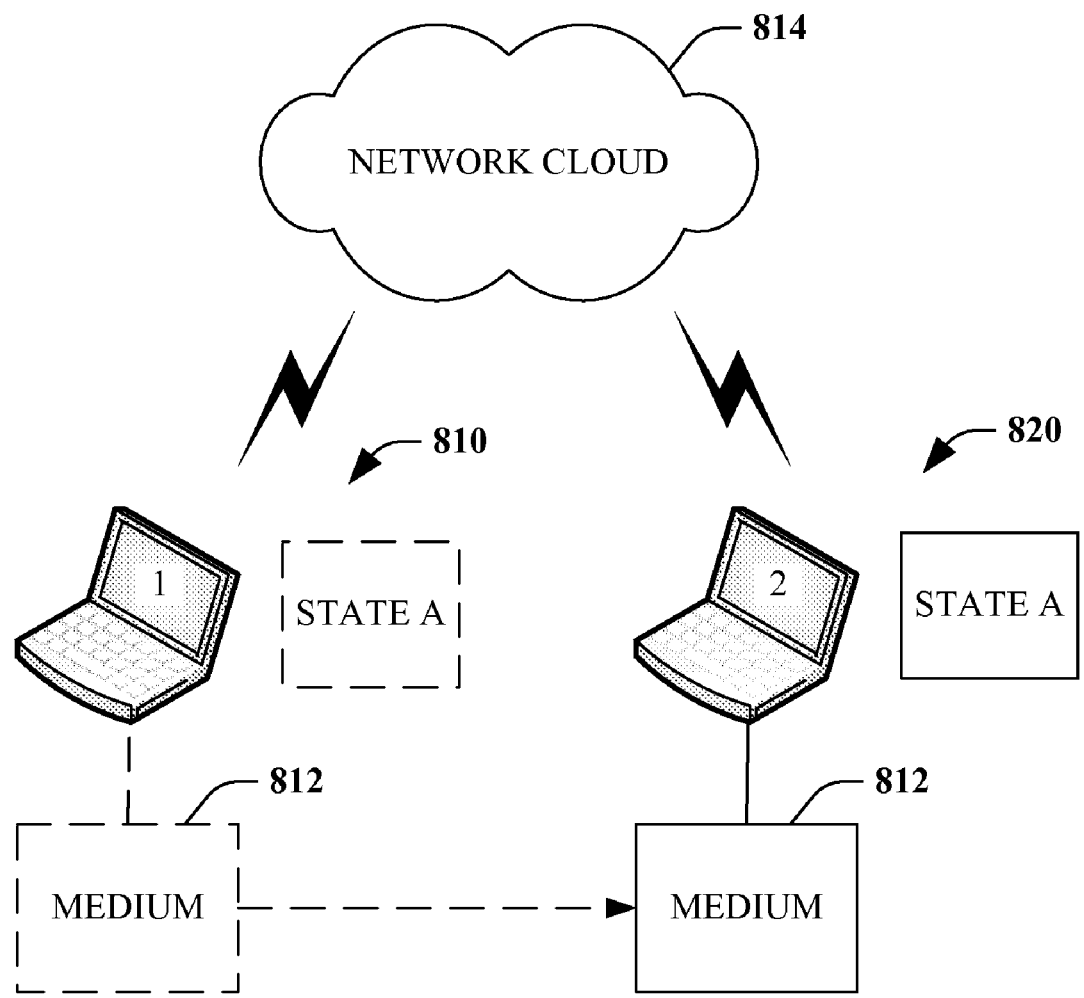
FIG. 8 is a block diagram of an exemplary import/export scenario in accordance with an aspect of the disclosed subject matter.

Referring to FIG. 8, an exemplary import/export scenario is depicted in accordance with an aspect of the claimed subject matter to facilitate clarity and understanding. A first computer 810 executes a computer program that results in a state being memoized. The state "A" can be exported from computer 810 to medium 812 and transported physically to computer 820. For example, the state could be exported to a flash memory drive or key drive, which can subsequently be provided to computer 810. Alternatively, the state can be exported and persisted to a network cloud resource 814, such as a server, that is accessible to or by both computer 810 and 820. The second computer 820 can then import the state provided or housed by the medium 812 or network cloud 814. In this manner, a function memo construct can be initialized with state established on a different computer. Now, the program is in the same state it was previously. Similarly, once a user is finished executing a program on computer 820 a memo table can be exported and utilized to initialize the same memo table on computer 810.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, such mechanisms can be employed to infer if and when to pre-fetch and/or remove memoized values or turn caching on or off.

In view of the exemplary systems described sura, methodologies that may be implemented in accordance with the disclosed subject matter will be better appreciated with reference to the flow charts of FIGS. 9-12. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 9:
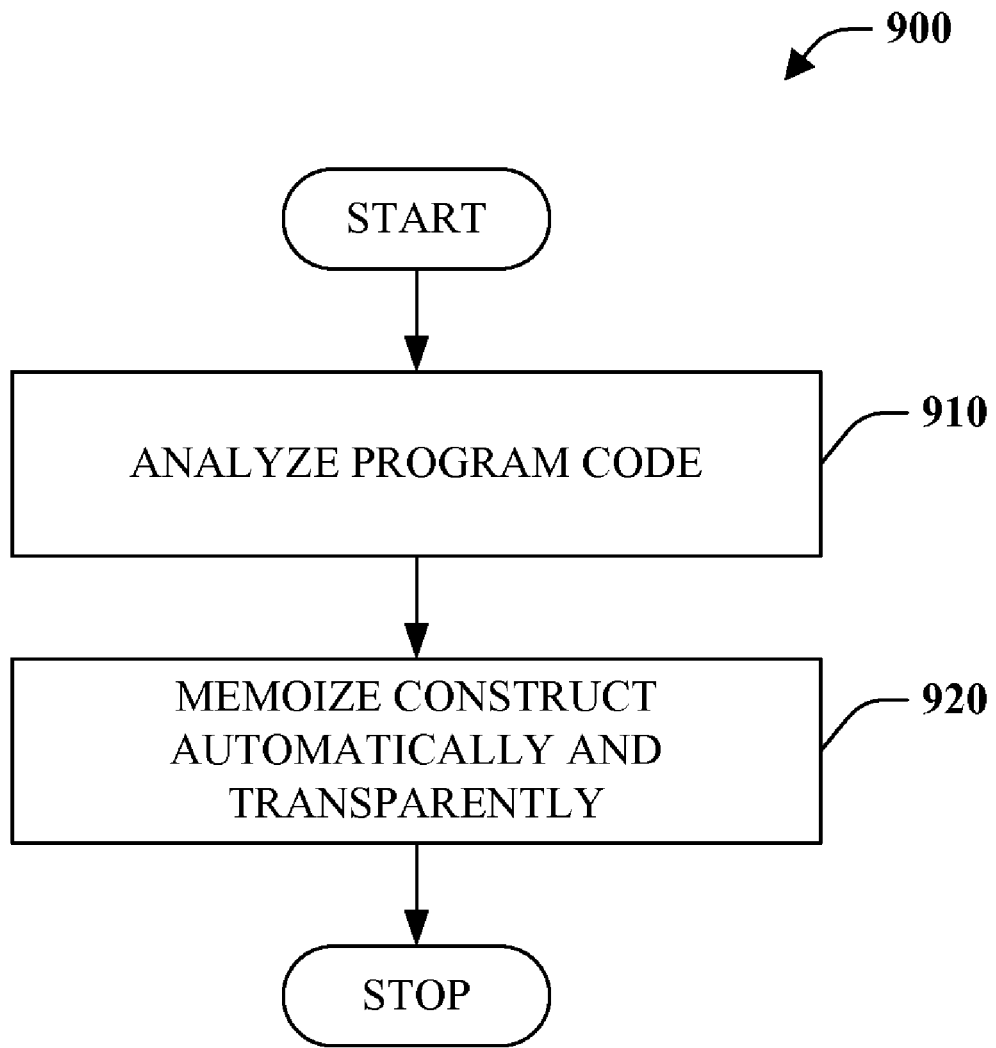
FIG. 9 is a flow chart diagram of a function memoization method in accordance with an aspect of the disclosed subject matter.

Referring to FIG. 9, a function memoization method 900 is illustrated in accordance with an aspect of the claimed subject matter. At reference numeral 910, program code is analyzed to identify functions or other constructs to be memoized. The analysis can be static or dynamic and correspond to identification of constructs for which memoization would improve or optimize execution thereof such as a Fibonacci or factorial function, for example. At reference numeral 920, identified functions are memoized automatically and transparently. For example, functions can be memoized without user or function knowledge and in a manner that does not require code to be re-written to target a memoized version of the function. In one instance, injected memoized code can override an original function and intercept calls thereto. For instance, "function A" can be overridden by subsequent specification of "A=memo (A, hash function)," where the memo function is in lined or housed in a linked library.

Figure 10:
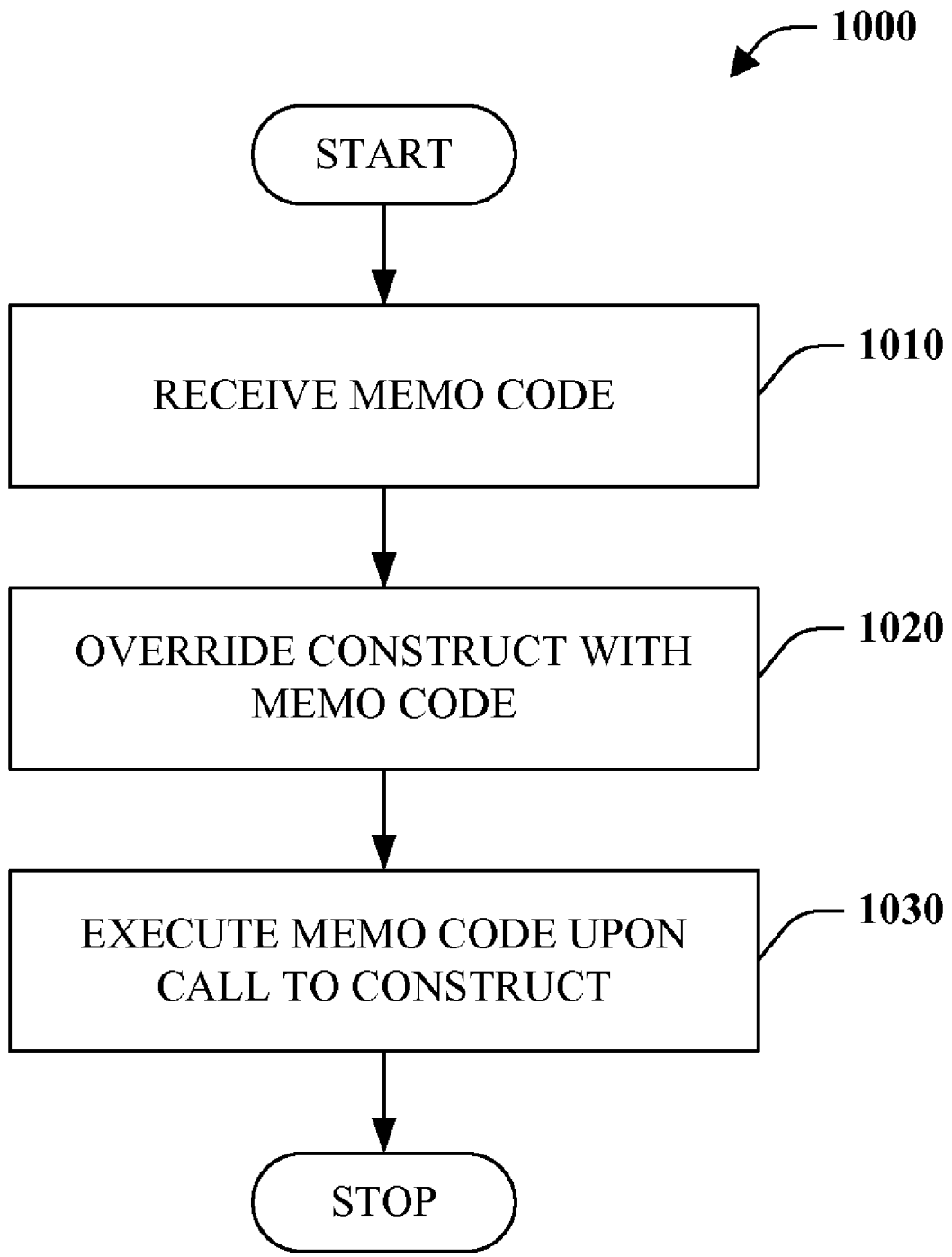
FIG. 10 is a flow chart diagram of a method of memoized function processing according to an aspect of the disclosed subject matter.

FIG. 10 depicts a method of memoized function processing 1000 in accordance with an aspect of the claimed subject matter. At reference numeral 1010, memoized code is received, for example "A=memo (A)." In one instance, such code can be received at runtime although the subject matter is not limited thereto. At numeral 1020, the construct subject to memoization (e.g., Function A) is overridden by the memoized code. At numeral 1030, memo code is executed in response to a call to the original construct.

Figure 11:
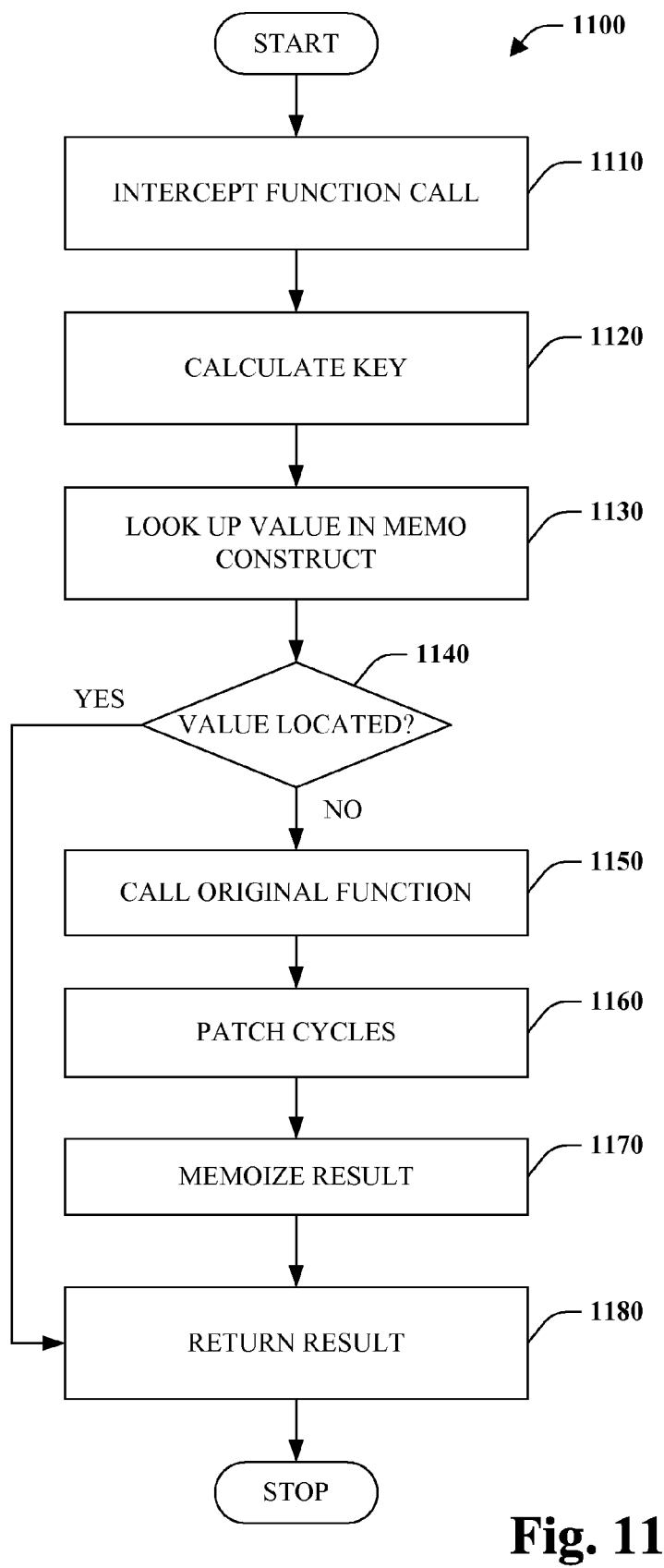
FIG. 11 is a flow chart diagram of a memoization method in accordance with an aspect of the disclosed subject matter.

Referring to FIG. 11, a memoization method 1100 is depicted according to an aspect of the claimed subject matter. At reference numeral 1110, a call to an un-memoized function or original function is intercepted. A key is calculated at numeral 1120 as a function of one or more call arguments. At numeral 1130, the key is utilized to access a memo storage construct to locate a value. In one instance, the key corresponds to the result of a hash function utilized to identify a slot in a memo table. At reference 1140, a determination is made as to whether a value was located at the identified location. If yes, the resultant value is retuned at 1170 and the method 1100 terminates. Alternative, the method continues at 1150 where the original or un-memoized function is called to determine the result. Where the function is recursive such as mutually recursive cycles can be patched at reference 1160. For instance, dummy values may be inserted initially and replaced with back links to a root. Alternatively, dummy values can be replaced with a reference to the root or a callback function passed substituted for the dummy value. At reference numeral 1170, the result the computed result is memoized or stored in the memo construct for future use. The computed results are then returned at 1180 and the method 1100 terminates.

Figure 12:
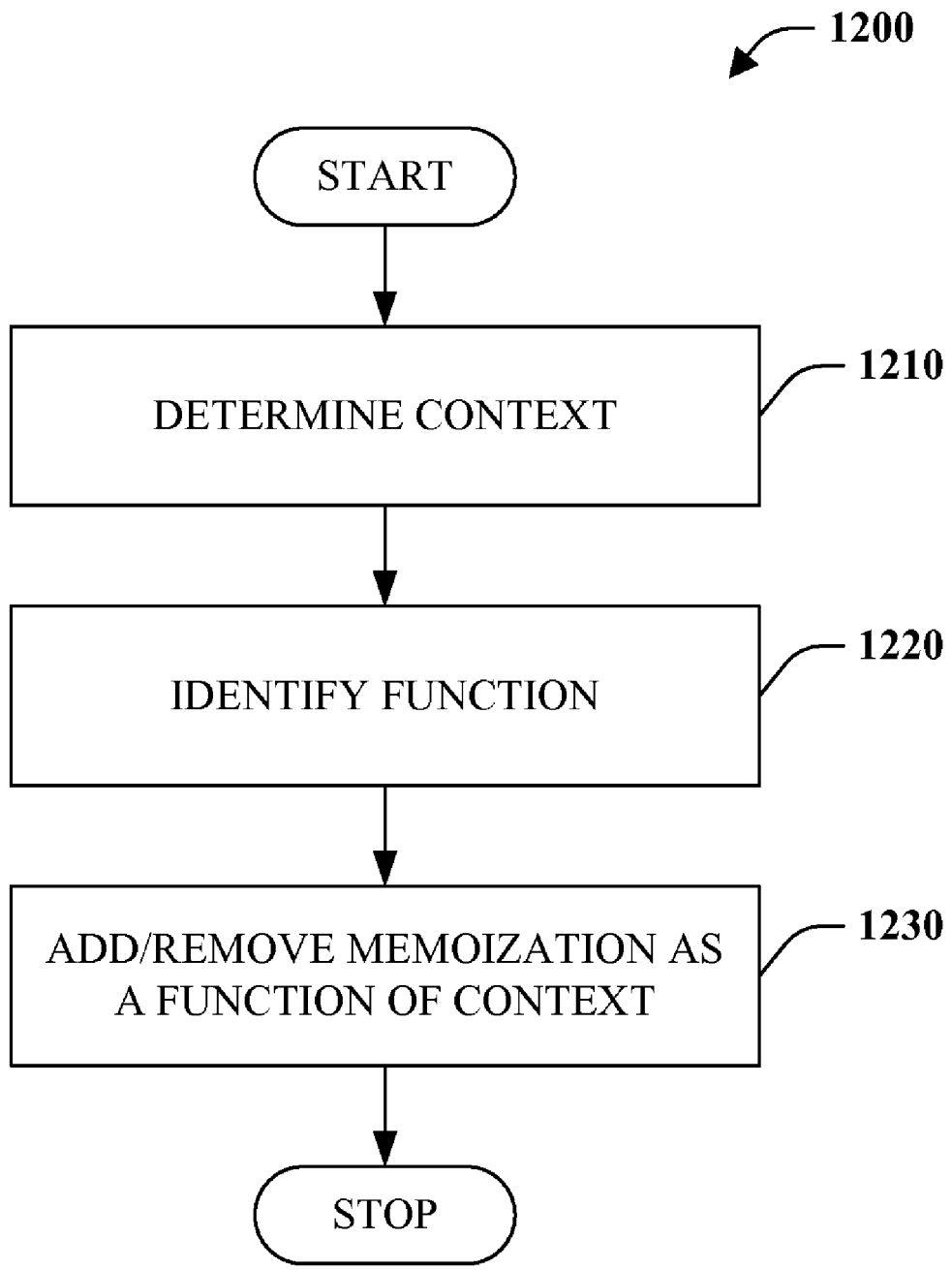
FIG. 12 is a flow chart diagram of a method of memoization management according to an aspect of the disclosed subject matter.

FIG. 12 is a flow chart diagram depicting a method of memoization management 1200 according to an aspect of the claimed subject matter. At numeral 1210, context is determined. Context can relate to operating environment or characteristics (e.g., online, offline . . . ) and/or load, among other things. At reference numeral 1220, a function is identified and at reference 1230, memoization is added or removed based on the context inter alia. For example where it is determined that execution speed and/or throughput needs to increase a function can be memoized to improve performance thereof. Alternatively, if memory space is an issue for example with a smaller platform, then memoization can be removed to increase availability. Similarly, memoized values can be removed or pre-fetched based on context information. Still further yet, function memoization can be toggled on and off based on context. For example, memoization can be removed and/or previous memoized values removed when a network dependent function is on line to ensure the most recent values are returned. In one instance, the function can always compute new values and cache them. When there is no network connectivity, the function can then return the latest values memoized.

Figure 13:
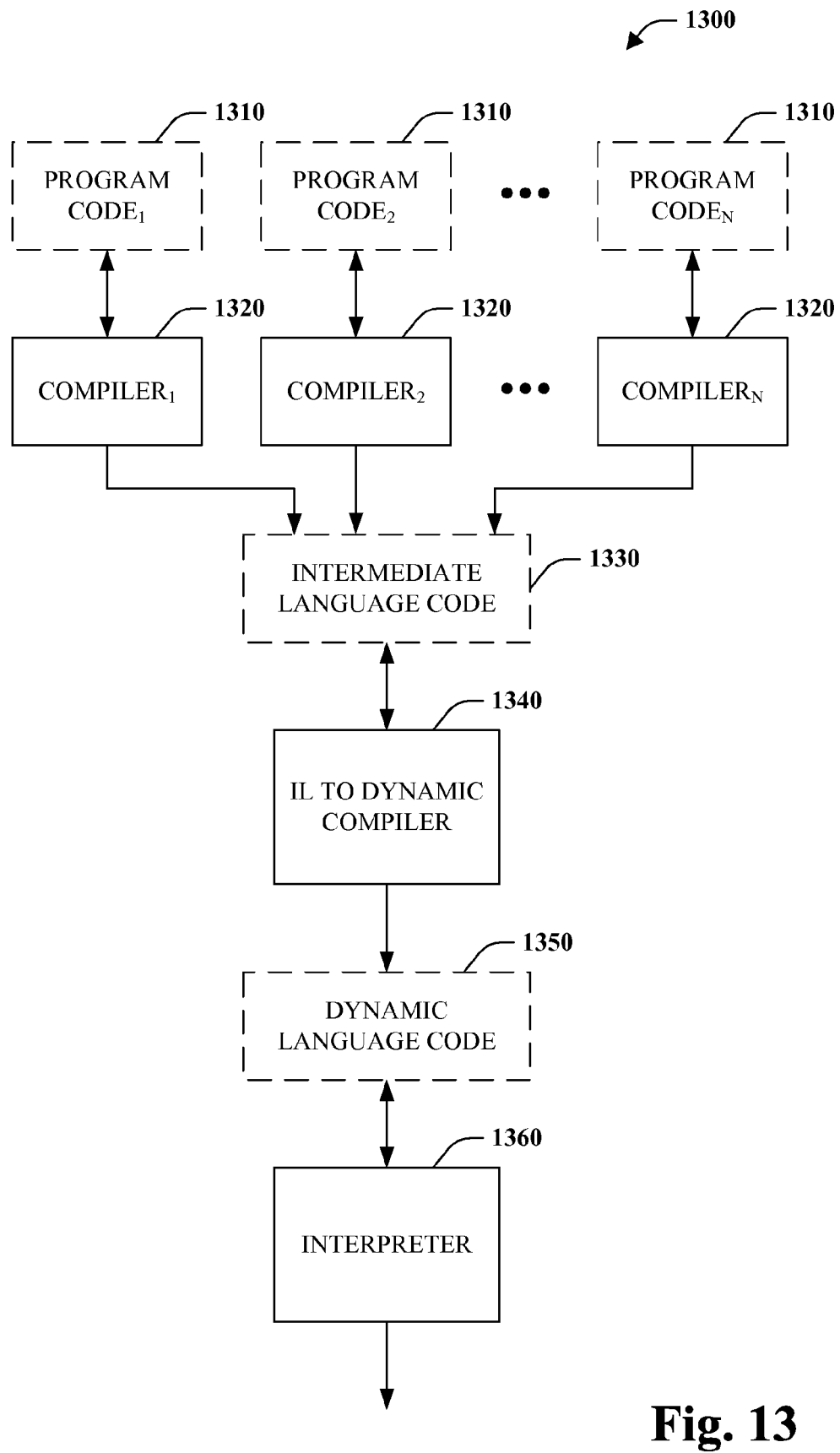
FIG. 13 is a schematic block diagram of one suitable operating environment in accordance with an aspect of the disclosed subject matter.

Referring to FIG. 13, a suitable operating environment 1300 is depicted for aspects of the claimed subject matter. As shown, program code 1310 encoded in a plurality of programming languages, represented by numerals 1-N where N is an integer greater than or equal to 1, can be compiled to intermediate language (IL) code 1330 via compilers 1320 associated with each different language 1-N. For example, code specified in C#™, Visual Basic™, JavaScript™, or Java™ can be compiled to intermediate language code 1330. Accordingly, the intermediate language code 1330 is common to multiple programming languages. The intermediate language code 1330 can then be compiled to dynamic language code 1350 by IL to dynamic compiler 1340. At numeral 1360, the dynamic code can be interpreted and executed. As a result, original C# code can be compiled to JavaScript or original Java code can be translated to Perl and executed, for example. In such instances, the functionality and type systems of source programming languages such as static languages can be embedded or captured by a dynamic language and associated runtime.

Previously described memoization functionality can be incorporated into system 1300 in numerous ways. By way of example and not limitation, the IL to dynamic compiler 1340 can inject dynamic code to memoized functions to optimized execution or ensure correct typing. Furthermore, the dynamic code can be reflective or self-modifying such that during runtime functions can be memoized and un-memoized among other things as a function of runtime context information.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 14:
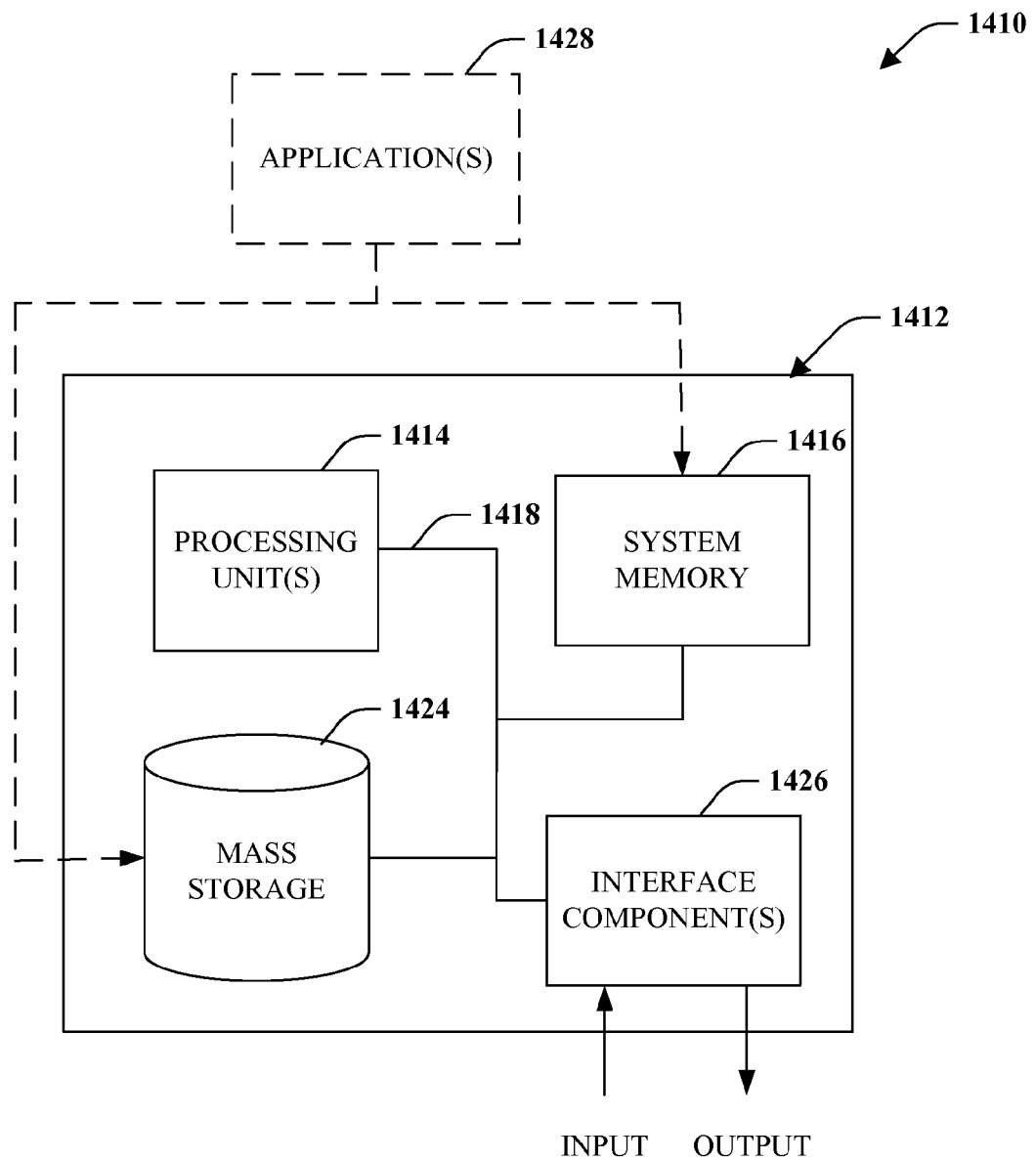
FIG. 14 is a schematic block diagram illustrating a suitable operating environment for aspects of the subject disclosure.
Figure 15:
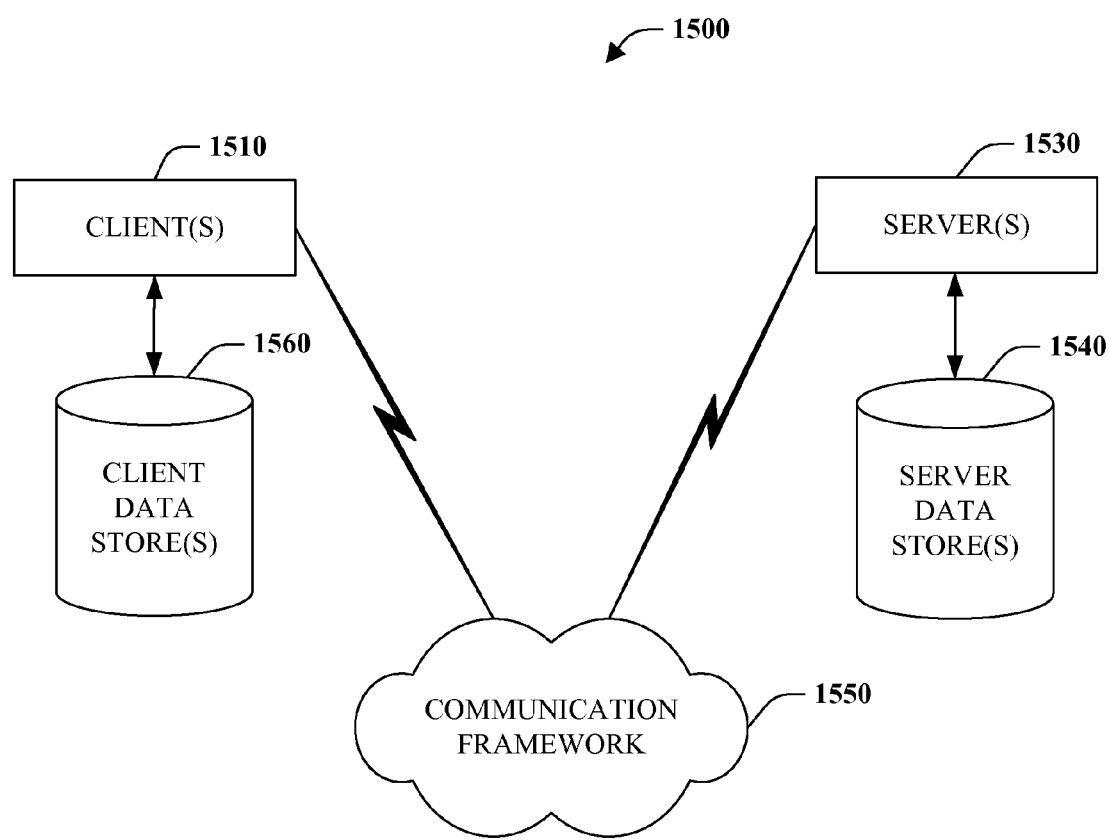
FIG. 15 is a schematic block diagram of a sample-computing environment.

In order to provide a context for the various aspects of the disclosed subject matter, FIGS. 14 and 15 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 14, an exemplary environment 1410 for implementing various aspects disclosed herein includes a computer 1412 (e.g., desktop, laptop, server, hand held, programmable consumer or industrial electronics . . . ). The computer 1412 includes a processing unit 1414, a system memory 1416 and a system bus 1418. The system bus 1418 couples system components including, but not limited to, the system memory 1416 to the processing unit 1414. The processing unit 1414 can be any of various available microprocessors. It is to be appreciated that dual microprocessors, multi-core and other multiprocessor architectures can be employed as the processing unit 1414.

The system memory 1416 includes volatile and nonvolatile memory. The basic input/output system (BIOS), containing the basic routines to transfer information between elements within the computer 1412, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1412 also includes removable/non-removable, volatile/non-volatile computer storage media. FIG. 14 illustrates, for example, mass storage 1424. Mass storage 1424 includes, but is not limited to, devices like a magnetic or optical disk drive, floppy disk drive, flash memory or memory stick. In addition, mass storage 1424 can include storage media separately or in combination with other storage media.

FIG. 14 provides software application(s) 1428 that act as an intermediary between users and/or other computers and the basic computer resources described in suitable operating environment 1410. Such software application(s) 1428 include one or both of system and application software. System software can include an operating system, which can be stored on mass storage 1424, that acts to control and allocate resources of the computer system 1412. Application software takes advantage of the management of resources by system software through program modules and data stored on either or both of system memory 1416 and mass storage 1424.

The computer 1412 also includes one or more interface components 1426 that are communicatively coupled to the bus 1418 and facilitate interaction with the computer 1412. By way of example, the interface component 1426 can be a port (e.g., serial, parallel, PCMCIA [Personal Computer Memory Card International Association], USB [Universal Serial Bus], FireWire . . . ) or an interface card (e.g., sound, video, network . . . ) or the like. The interface component 1426 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1412 to output device(s) via interface component 1426. Output devices can include displays (e.g., CRT [cathode ray tube], LCD [liquid crystal display], plasma . . . ), speakers, printers and other computers, among other things.

FIG. 15 is a schematic block diagram of a sample-computing environment 1500 with which the subject innovation can interact. The system 1500 includes one or more client(s) 1510. The client(s) 1510 can be hardware and/or software (e.g., threads, processes, computing devices). The system 1500 also includes one or more server(s) 1530. Thus, system 1500 can correspond to a two-tier client server model or a multi-tier model (e.g., client, middle tier server, data server), amongst other models. The server(s) 1530 can also be hardware and/or software (e.g., threads, processes, computing devices). The servers 1530 can house threads to perform transformations by employing the aspects of the subject innovation, for example. One possible communication between a client 1510 and a server 1530 may be in the form of a data packet transmitted between two or more computer processes.

The system 1500 includes a communication framework 1550 that can be employed to facilitate communications between the client(s) 1510 and the server(s) 1530. The client(s) 1510 are operatively connected to one or more client data store(s) 1560 that can be employed to store information local to the client(s) 1510. Similarly, the server(s) 1530 are operatively connected to one or more server data store(s) 1540 that can be employed to store information local to the servers 1530.

Client/server interactions can be utilized with respect to enabling memoization described herein. For example, consider a constrained client 1510 such as a mobile device. Rather than performing memoization on the client 1510, at least a portion of the functionality can be distributed utilizing the communication framework 1550 and a server 1530. For instance, computations can be performed by a server 1530 and cached on a client 1510. In this manner, functions can be transparent as to whether where calculation occurs.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

What is claimed is:

1. A memoization system, comprising at least one processor and least one computer-readable storage medium storing instructions executable by the at least one processor to implement:
    an analysis component configured to perform analysis of program code;
    a memo component configured to memoize a function in response to the analysis at least in part via code injection;
    a storage component configured to provide functionality pertaining to storing and returning computed function results, and including a generation component configured generate a storage construct to store computed function results, in the form of a hash table accessible by at least one of
    a hash function or a key selector specified in code,
    a default function if no explicit hash function or key selector is specified in code, or
    a function inferred from contextual information; and
    a custom component configured to inject functionality in addition to code injected via the code injection, the functionality including
    functionality pertaining to creation or detection of cycles in a recursion, and
    functionality to insert a dummy value into the storage construct and a called function, scan a result of the called function for occurrences identical to the dummy value, and replace the occurrences with a back link to a root value of a recursive graph corresponding to the called function.

2. The system of claim 1, further comprising a component configured to remove cached values employed by a memoized function in accordance with a policy.

3. The system of claim 1, further comprising a component configured to pre-fetch and load one or more values in the storage.

4. The system of claim 1, further comprising a component configured to remove function memoization.

5. The system of claim 1, the memoized function including a component configured to identify whether values should be re-computed or retrieved from cache, when available.

6. The system of claim 1, further comprising an export component configured to persist data of the storage construct to a computer-readable storage medium.

7. The system of claim 1, further comprising an import component configured to load data from a computer-readable storage medium into the storage construct.

8. The system of claim 1, the memo component being configured to transform the function into an idempotent function.

9. The system of claim 1, the analysis component being configured to identify whether memoization is to be turned on or off as a function of at least one of online or offline network connectivity.

10. The system of claim 1, further comprising a component configured to add logging and/or security functionality.

11. The system of claim 1, the analysis and memo component forming part of a compiler.

12. A method of computer program interpretation, comprising using at least one processor to execute instructions stored on at least one computer-readable storage medium to perform operations including:
    injecting code into a program to memoize a function;
    generating a storage construct configured to store results of a computation corresponding to the function;
    forming a hash function to access the stored results;
    customizing the code by injecting additional functionality pertaining to creating or detecting cycles in a recursion;
    overriding the function with the customized code in response to a call to the function;
    in response to the overriding, inserting a dummy value into the storage construct and the called function;
    accessing the dummy value in the storage construct using at least one of a hash function or a key selector specified in code, a default function if no explicit hash function or key selector is specified in code, or a function inferred from contextual information;
    scanning a result of the called function for occurrences identical to the dummy value; and
    replacing the occurrences with a back link to a root value of a recursive graph corresponding to the called function.

13. The method of claim 12, further comprising recording values of previous calls in an instance method field.

14. The method of claim 12, further comprising computing a unique key to facilitate location of a previously generated value stored in the storage construct as a function of one or more arguments associated with a call to the function.

15. The method of claim 14, further comprising employing one of a specified, default or inferred key generation function.

16. The method of claim 14, further comprising returning a previously generated value located in the storage construct.

17. The method of claim 12, further comprising employing backpatching to detect or create cycles.

18. A computer-readable storage medium storing instructions executable by a computing device to perform the method of claim 12.

* * * * *